United States Patent [19]

Deutsch et al.

[11] Patent Number: 4,623,945
[45] Date of Patent: Nov. 18, 1986

[54] AUTOMATIC INSERTION/EJECTION LINKAGE FOR A MAGNETIC-TAPE-CASSETTE APPARATUS

[75] Inventors: Armin Deutsch; Henricus M. Ruyten, both of Wetzlar, Fed. Rep. of Germany

[73] Assignee: U.S. Philips Corporation, New York, N.Y.

[21] Appl. No.: 593,799

[22] Filed: Mar. 27, 1984

[30] Foreign Application Priority Data

Apr. 2, 1983 [DE] Fed. Rep. of Germany ....... 3312136
Apr. 11, 1983 [NL] Netherlands .......... 8301267

[51] Int. Cl.⁴ .......................................... G11B 15/00
[52] U.S. Cl. .................................................. 360/96.5
[58] Field of Search ............ 360/93, 96.1, 96.5, 360/96.6, 105, 88; 242/197, 198, 199

[56] References Cited

U.S. PATENT DOCUMENTS 3,524,651 8/1970 Ketzer ................................ 360/105
3,669,455 6/1972 Cicatelli .............................. 360/105
3,669,456 6/1972 Oteki ................................... 360/105

Primary Examiner—Robert S. Tupper
Assistant Examiner—Andrew L. Sniezek
Attorney, Agent, or Firm—David R. Treacy

[57] ABSTRACT

For automatically completing insertion and ejection of a magnetic-tape-cassette into a holder, an actuating rod carries a pin which engages a slot in an insertion/ejection lever. During insertion of a cassette into a holder, pivoting of the lever causes relative movement of the pin with respect to a control edge of the slot along a first portion, and then along a second portion in which force of an ejection spring moves the actuating rod and continues pivoting of the lever to cause the cassette to move to the fully inserted position. During ejection, movement of the actuating rod moves the pin along a first stop edge portion of the slot to pivot the lever, until the spring passes an overcenter point and causes the lever to continuing pivoting and to eject the cassette.

2 Claims, 3 Drawing Figures

AUTOMATIC INSERTION/EJECTION LINKAGE FOR A MAGNETIC-TAPE-CASSETTE APPARATUS

BACKGROUND OF THE INVENTION

The invention relates to a device for inserting a magnetic-tape cassette into and ejecting it from a magnetic-tape cassette apparatus and more particular to such apparatus having, a cassette holder with an insertion opening for the cassette, a cassette driver which is movably guided in the cassette holder and which is coupled to a lever which is pivotable and a pivoting spindle arranged on the frame. An actuating rod which is movably guided in the frame and cooperates with an insertion/ejection spring, which moves the driver with the cassette towards that side of the cassette holder which is remote from the insertion opening. The spring is a compression spring secured to the actuating rod and the lever, the points of attachment of the spring to the actuating rod and the lever being arranged in such a manner relative to the pivoting spindle of the lever that during actuation of an ejection member to move the actuating rod in an ejection direction and the resulting pivotal movement of the lever, the point of attachment on the lever passes through a plane containing the pivoting spindle and the point of attachment on the actuating rod (that is, an over-center position), after which the spring pivots the lever further and ejects the cassette.

A device of the specified type is disclosed in U.S. Pat. No. 3,485,500. This device comprises a plurality of levers which cooperate with a compression spring. An insertion lever and an ejection lever, insert or eject the cassette when the insertion lever and the point of attachment of the spring on a further lever, which is connected to the actuating rod, pass through the plane containing the pivoting spindle. The spring provides an automatic insertion and ejection path which is short when considering the construction of the parts of the known device. Moreover, the cooperation of these parts with each other is such that the likelihood of incorrect operation increases.

SUMMARY OF THE INVENTION

It is the object of the invention to construct the known device in such a manner that both during insertion and ejection the spring has an optimum effect, whilst the load to which the frame is subjected is minimal. To this end the invention is characterized in that the spring is connected directly to the actuating rod, the actuating rod is provided with a pin which during insertion of the cassette into the cassette holder makes a relative movement along a control edge on an insertion/ejection lever, the lever being pivoted further by the pin until the cassette occupies the end position in the holder under the influence of the force exerted on the actuating rod by the spring after the movement relative to a part of the control edge, the control edge and a stop edge are formed as wall portions of a slot in the lever, and during actuation of the ejection member the pin is urged against the stop edge, and is moved further along this stop edge during the pivotal movement of the lever owing to the force exerted by the spring, thereby ejecting the cassette.

Owing to the direct connection of the spring to the lever and the actuating rod the spring force is exerted on the lever and the actuating rod in the most direct manner, so that no undesirable load is exerted on the frame. These steps enable automatic insertion over a comparatively large distance under the influence of the spring after a short manual insertion of the cassette and an automatic ejection over a comparatively large distance by means of a short stroke of the actuating rod. This yields the additional advantage that the last part of the cassette ejection is effected under the influence of an easy-to-control force provided by the spring, so that during the last part of the movement in the holder the cassette has a speed which is not too high, thereby preventing the cassette from being thrown out of the holder. This is of advantage, for example, when such a magnetic-tape-cassette apparatus is used in a motor car. Moreover, this results in a compact construction with few parts, which is also important when the device is used in for example an apparatus intended for use in motor cars.

A preferred embodiment of the invention is characterized in that the stop edge is situated in a long side wall and the control edge in a short side wall of the slot. This provides a practical and effective guidance for the pin, and ensures that immediately after completion of the ejection movement and the release of the ejection member the pin resumes the original position at the beginning of the control edge.

An embodiment of the invention will be described in more detail, by way of example, with reference to the drawings.

DESCRIPTION OF THE PREFERRED EMBODIMENT

Figure 1:
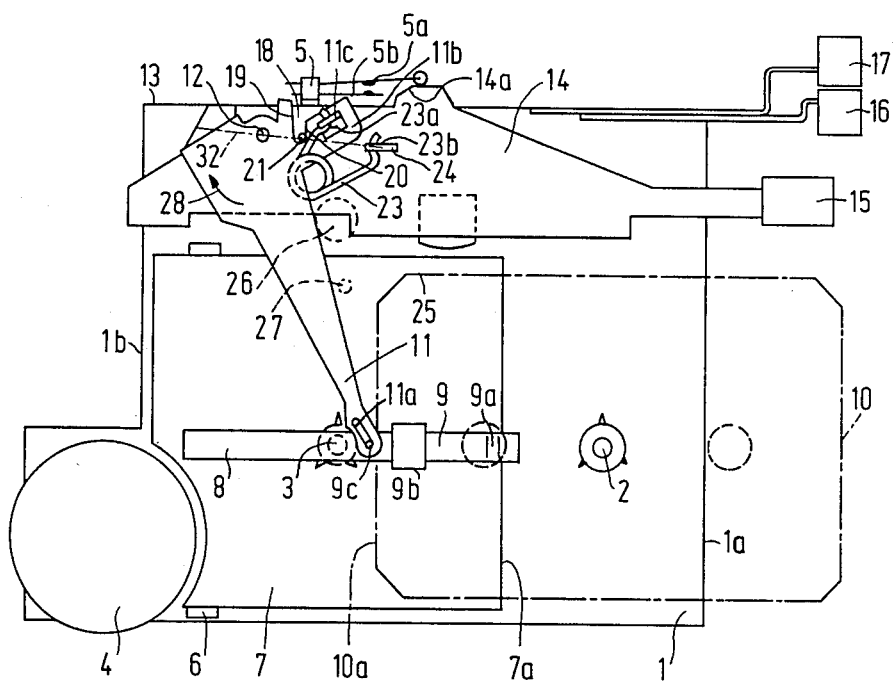
FIG. 1 is a plan view of a magnetic-tape-cassette apparatus equipped with a device in accordance with the invention, parts of which are not relevant to the invention not being shown and the device being in a position which it assumes during ejection of a cassette.

The magnetic-tape-cassette apparatus shown in FIG. 1 has a frame 1 in which two winding spindles 2 and 3 are mounted for rotation, the winding spindles being drivable during operation by a motor 4 through a transmission, not shown. The electrical connection of the motor 4 can be switched by means of an electric motor switch 5 which has contacts 5a and 5b and which is secured to the frame 1.

The frame 1 has an at least partly open front side 1a, and carries a cassette lift 7 which constitutes a holder for a magnetic-tape-cassette 10 and which is pivotable about a pivoting spindle 6. The pivoting spindle 6 extends parallel to the front 1a of the frame and is preferably arranged near the rear 1b of the frame 1, where the motor 4 is also situated. In the cassette lift or holder 7 a guide slot 8 is formed, in which a cassette or catch driver 9, which is preferably made of a plastic, is movably guided by a portion 9b which overlaps the slot 8 edges. Near its free end the driver 9 has a projection 9a which extends towards the frame 1 and which as a result of the elastic construction of the driver 9 and the location of the projection is elastically movable in a winding-spindle aperture in a major wall of the magnetic-tape-cassette 10, if this cassette is inserted into the lift 7 by the user. Near its rearward end the driver 9 is provided with a pin 9c. This pin 9c serves as a stop for the short sidewall 10a of the cassette and also extends up through a slot 11a in a lever 11. The lever 11 is pivotable about a pivoting spindle 12 connected to the frame 1 near a longitudinal side 13 of the frame 1. An actuating rod 14 is guided so as to be movable parallel to the longitudinal side 13 which extends between the front 1a and the rear 1b. The rod is preferably made of a sheet material, and projects from the front 1a of the frame, where it is connected to an ejection member comprising an eject button 15. The magnetic-tape-cassette apparatus further comprises two actuating buttons 16 and 17, which in a manner not shown control the fast forward and fast reverse winding of the magnetic tape in the magnetic-tape cassette 10.

Figure 2:
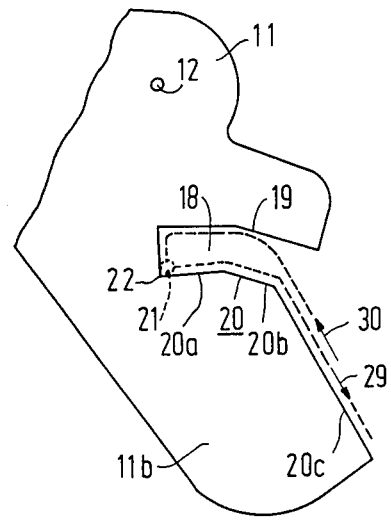
FIG. 2 shows on an enlarged scale a part of the level which forms part of the device in accordance with the invention and the displacement of the pin relative to the lever during insertion and ejection.

The lever 11 is formed with a slot 18 having a long side wall 19 and a short side wall 20. As shown in FIG. 2, the short side wall 20 has a control edge and the long side wall 19 has a stop edge for a pin 21 arranged on the actuating rod 14. In the position shown in FIGS. 1 and 2, in which the actuating rod 14 is almost fully withdrawn, the pin 21 is situated in a corner 22 of the slot 18. This is the position of the pin when the cassette has been ejected or a new cassette is about to be inserted.

Further, the lever 11 comprises a projection 11b which adjoins the short side wall 20 having the control edge. The projection 11b is provided with an attachment element 11c for a flat helical compression spring 23 which is also connected, at its other end, to an attachment element 24 on the actuating rod 14. The actuating rod 14 is provided with a cam surface 14a which in the position shown in FIG. 1 keeps the contact 5a spaced from the contact 5b, so that the motor is switched off. The points of attachment 23a and 23b of the spring 23 are in contact with the attachment elements 11c and 24, respectively.

As is shown schematically in FIG. 1, the magnetic-tape-cassette apparatus further comprises a magnetic head 25 and a pressure roller 26, which are arranged on a head-mounting plate, now shown. The frame 1 carries a capstan 27 which is rotated by the motor 4 during operation.

When a cassette 10 is inserted, the cassette is at least partly slid into the lift or holder 7 through the opening 7a. This is the position shown in FIG. 1. In this position the driver 9 is clamped in the opening of the cassette by the projection 9a which extends towards the frame 1, the side wall of the cassette 10 bearing against the pin 9c. When manual inward pressure is exerted on the cassette 10 in the lift 7, the lever 11 is pivoted about the pivoting spindle 12 in the direction indicated by the arrow 28 in FIG. 1. As a result of this, the driver 9 slides in the guide slot 8 until the pin 9c has reached the back of the lift or holder 7.

Figure 3:
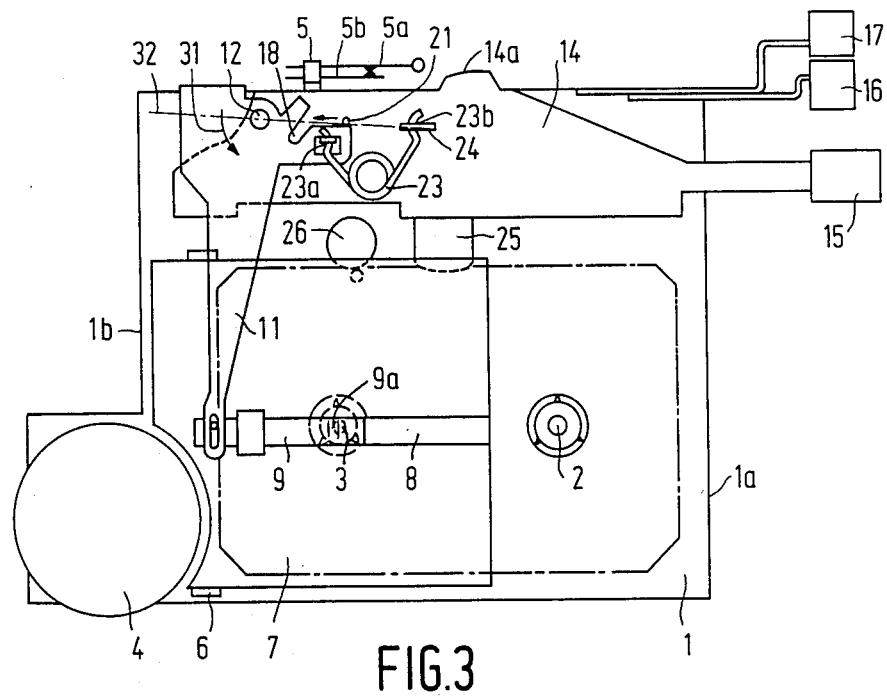
FIG. 3 is a plan view of the apparatus shown in FIG. 1, the device being in a position which it occupies when the cassette is inserted fully.

As a result of the pivotal movement of the lever 11 the pin 21 has left the corner 22 and has slid along the control edge 20 of the lever, in such a way that after the movement along a first portion 20a, the pin has passed the corner which is situated at the point where the portion 20a second adjoins a portion 20b of the control edge, the pin performing a relative compound movement with respect to the lever as indicated by the arrow 29 in FIG. 2. After passing the corner between the portion 20a and the portion 20b, the pin will be influenced by the force exerted on the actuating rod 14 by the spring 23, so that the lever 11 is pivoted further by the spring. Owing to this pivotal movement the driver 9 with the cassette 10 which is coupled thereto is moved inward towards that side of the cassette lift or holder 7 which is situated near the back 1b of the frame, without an external force being exerted on the apparatus. At the end of the movement along the control edge 20 the pin 21 slides along a portion 20c of the control edge which as a result of the pivotal movement of the lever 11 now extends parallel to the longitudinal side 13 of the frame 1. In this way the pin can slide freely towards the front 1a of the frame, the actuating rod 14 and the eject button 15 being moved towards the front 1a until they abut with a stop, not shown. During this movement the cam surface 14a has become disengaged from the contact 5a, so that the motor switch 5 is closed and the motor 4 is started. At the same time during this movement of the actuating rod 14 the lift 7 is pivoted towards the frame 1 about the pivoting spindle 6 by means of a coupling, not shown, between the actuating rod and the cassette lift 7, so that the hubs of the cassette 10 engage the winding spindles 2 and 3. Immediately after this movement the head-mounting plate, not shown, is moved towards the cassette, so that the magnetic head 25 cooperates with the magnetic tape and the pressure roller 26 is applied to the capstan 27. At this instant the tape transport is started and the apparatus begins to play and/or record signals on the magnetic tape. This situation is shown in FIG. 3.

If the user wishes to eject the magnetic-tape cassette 10 the eject button 15 is pressed inwards in a direction towards the front 1a of the frame 1. The actuating rod 14 then moves to the position shown in FIG. 1. As a result of this, the pin 21 again moves along the portion 20c of the control edge, as indicated by an arrow 30 in FIG. 2. The pin 21 further makes a relative movement with respect to the lever 11 in the direction indicated by the arrow 13, until the pin has reached the stop edge constituted by the long side wall 19 of the slot 18. Subsequently the pin 21 moves along the stop edge of the side wall 19, the pin exerting a torque on the lever 11, thereby moving the lever 11 in a direction indicated by the arrow 31 in FIG. 2. The pin 9c then bears against the side wall 10a of the casette and urges the cassette towards the front 1a of the frame.

Before this movement, the lift 7 has pivoted upwards about the pivoting spindle 6 and the switch 5 has been opened again by engagement of the cam surface 14 with the contact 5a. The magnetic head 25 and the pressure roller 26 then have resumed the position shown in FIG. 1. During the movement of the actuating rod 14 the point of attachment 23a of the spring 23 on the lever 11 has passed through a plane 32 containing the pivoting spindle 12 and the point of attachment 23b on the actuating rod, namely from the a position below to a position above the plane 32 as viewed in FIG. 3. As a result of this passage through the dead center position in the plane 32, the spring 23 will exert a positive torque about the spindle 12, causing the lever 11 to pivot further in a direction indicated by the arrow 31. The pin 21 then moves further along the stop edge 9. This pivotal movement under the influence of the spring 23 ejects the cassette. At the end of the movement, after the eject botton 15 has been released, the pin 21 is again situated in the corner 22.

The construction described above has the advantage that during insertion of the cassette, as the pin slides along the wall portion 20b of the control edge 20, it exerts a positive insertion force on the cassette and guides the cassette into the lift 7 during the last part of the insertion movement; while during ejection the spring ensures the automatic ejection of the cassette after the passage through said plane 32. The spring 23 used for this purpose enables a compact construction. Compactness is also aided by the shape of the slot 18 in the lever, which thus forms both the control edge 20 and the stop edge 19. During ejection the pin 21 abuts with the stop edge 19, the pin producing the first part of the pivotal movement of the lever in the direction indicated by the arrow 31, until the spring 23 provides the last part of the pivotal movement.

A special advantage of the construction is that the last stage of insertion of the cassette and the last stage of ejection to the cassette is not obtained by manual force, but by spring force. The insertion and ejection forces in the device in accordance with the invention, comprising the lever 11, the spring 23, the actuating rod 14, the pin 21 connected to this rod, and the driver 9 can be obtained in a simple and cheap manner. In view of the limited space required by this construction the device is particularly suitable for magnetic-tape-cassette equipment intended for use in car radios.

What is claimed is:

1. A magnetic-tape-cassette apparatus having a linkage for automatically inserting and ejecting a magnetic-tape cassette, said apparatus comprising:

a frame having a pivot spindle disposed thereon, a cassette holder having an insertion opening for a cassette, and an end position defined in the holder; and a cassette driver, adapted for engaging a cassette inserted into the holder, movably guided in the cassette holder, a lever pivotally mounted on said spindle, and coupled to said driver, an actuating rod movably guided in said frame, and an ejection member connected to said rod, a spring secured to the actuating rod at a first point of attachment, and to said lever at a second point of attachment, said points of attachment being arranged relative to the pivoting spindle so as to form an over-center linkage, following actuation of the ejection member, said spring then pivoting said lever further and ejecting the cassette; said second point of attachment passing through a plane containing the pivoting spindle and the first point of attachment, characterized in that said spring is connected directly to the actuating rod, said lever has a slot therein having wall portions forming a control edge and a stop edge, said actuating rod comprises a pin which undergoes relative movement along a first part of said control edge during insertion of the cassette into the holder, and then along a second part of the control edge arranged such that, under influence of the force exerted on the actuating rod by the spring, said relative movement pivots said lever further until the cassette occupies the end position in the holder, upon actuation of the ejection member to move the actuating rod in an ejection direction, said pin is urged against a first portion of the stop edge thereby pivoting said lever in a cassette-ejecting direction until said second point of attachment passes through said plane, and is then moved further along said stop edge during pivotal movement due to the force exerted by said spring, thereby ejecting the cassette.

2. An apparatus as claimed in claim 1, characterized in that said slot has a short and long branch, said control edge being disposed along said short branch, and said stop edge being situated in said long branch.

* * * * *